United States Patent [19]

Dunaway

[11] Patent Number: 5,392,619
[45] Date of Patent: Feb. 28, 1995

[54] LOCKABLE LICENSE PLATE HOLDER

[76] Inventor: John G. Dunaway, 1707 Frederick Ave., Baltimore, Md. 21223

[21] Appl. No.: 101,619
[22] Filed: Aug. 6, 1993
[51] Int. Cl.$^6$ .................... G09F 7/00; E05B 65/12
[52] U.S. Cl. ................................ 70/57; 70/258; 40/202
[58] Field of Search ............ 70/14, 57, 58, 1, 229–232, 70/158–169, 237, 258; 40/200–202, 209

[56] References Cited

U.S. PATENT DOCUMENTS

| | | | |
|---|---|---|---|
| 1,454,413 | 5/1923 | Rose | 40/202 |
| 1,481,937 | 1/1924 | Thorn | 40/202 |
| 1,517,178 | 11/1924 | Thorn | 40/202 |
| 1,821,053 | 9/1931 | Dietz et al. | 40/202 |
| 1,829,824 | 11/1931 | Forrester | 70/57 X |
| 1,995,984 | 3/1935 | Hudson | 40/209 |
| 2,142,906 | 1/1939 | Lyle | 70/423 X |
| 2,212,403 | 8/1940 | Robinson | 40/201 |
| 2,507,875 | 5/1950 | Williams | 70/57 X |
| 2,603,015 | 7/1952 | Knipple | 40/202 |
| 2,655,806 | 10/1953 | Stiler | 70/57 |
| 2,661,558 | 12/1953 | Salisbury | 70/232 X |
| 2,878,663 | 3/1959 | Smith | 70/14 |
| 2,996,909 | 8/1961 | Raye | 70/57 |
| 3,877,264 | 4/1975 | Foglietti et al. | 70/237 |
| 4,253,698 | 3/1981 | Hodson | 70/237 |
| 4,441,344 | 4/1984 | Kurpershoek | 70/258 X |
| 4,724,689 | 2/1988 | Anchia | 70/58 |
| 5,012,602 | 5/1991 | Storey | 40/202 X |

*Primary Examiner*—Peter M. Cuomo
*Assistant Examiner*—Suzanne L. Dino

[57] ABSTRACT

This device is for preventing unauthorized access, and theft of automobiles license plates. This license plate lock works by first fastening the license plate locking device to the automobile with bolts that are put in back of the device. Next unlocking the lock in front of the device, this can be with a key lock, or combination lock. Next the movable arm swings up and down so that the license plate can be put inside of the device and locked up.

1 Claim, 3 Drawing Sheets

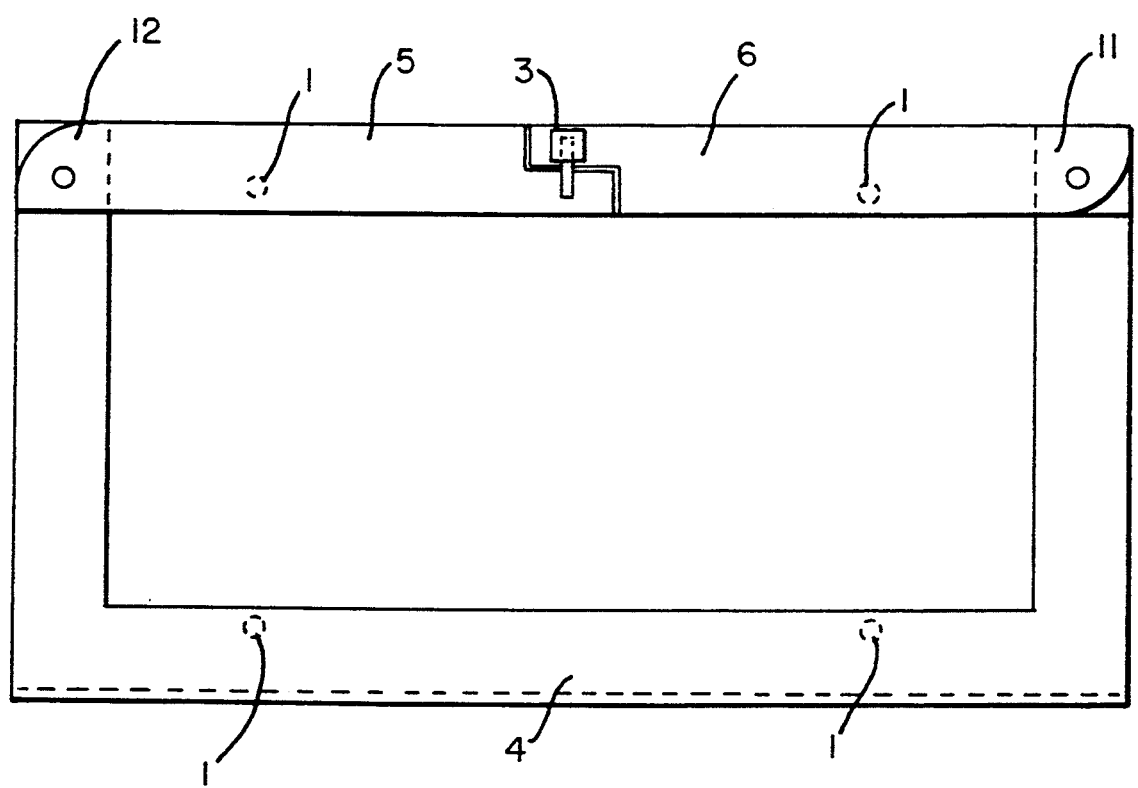

LOCKABLE LICENSE PLATE HOLDER

BACKGROUND OF THE LICENSE PLATE HOLDER

The license plate that is in use now leaves your plate and license sticker open for theft. The license plate can be easily removed by anyone. There is no form of protection to keep thefts from occuring. License plates (stolen) are in more demand due to the rise in car theft and car jackings.

The lockable license plate holder is to protect license plates from being stolen from and/or off parked vehicles. The lockable license plate holder will be made of steel or another metal type material that would be bolted directly to the bumper of vehicle.

SUMMARY OF LOCKABLE LICENSE PLATE HOLDER

What makes this invention what it is, is that it has a locking device, which after the license plate is in place it is locked. The only way it can, be removed is by a key or combination (which ever type of lock is used).

BRIEF DESCRIPTION OF THE DRAWING

FIG. 1 is a side view of the license plate locking device of the preferred embodiment.

FIG. 2 is a front view of the license plate lock showing the locking device and movable arms.

DETAILED DESCRIPTION OF LOCKABLE LICENSE PLATE HOLDER

Figure 2A:
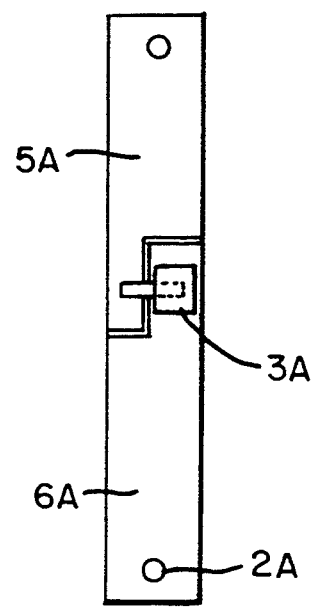
FIG. 2A is an optional embodiment of the license plate locking device.
Figure 3:
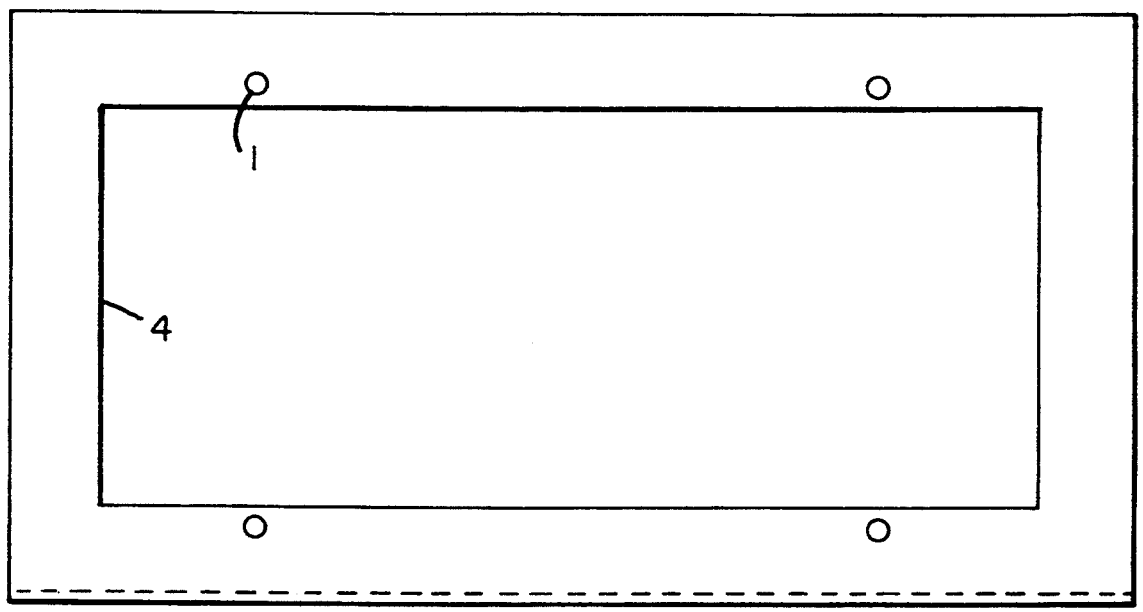
FIG. 3 is a back view of the license plate locking device.
Figure 4:
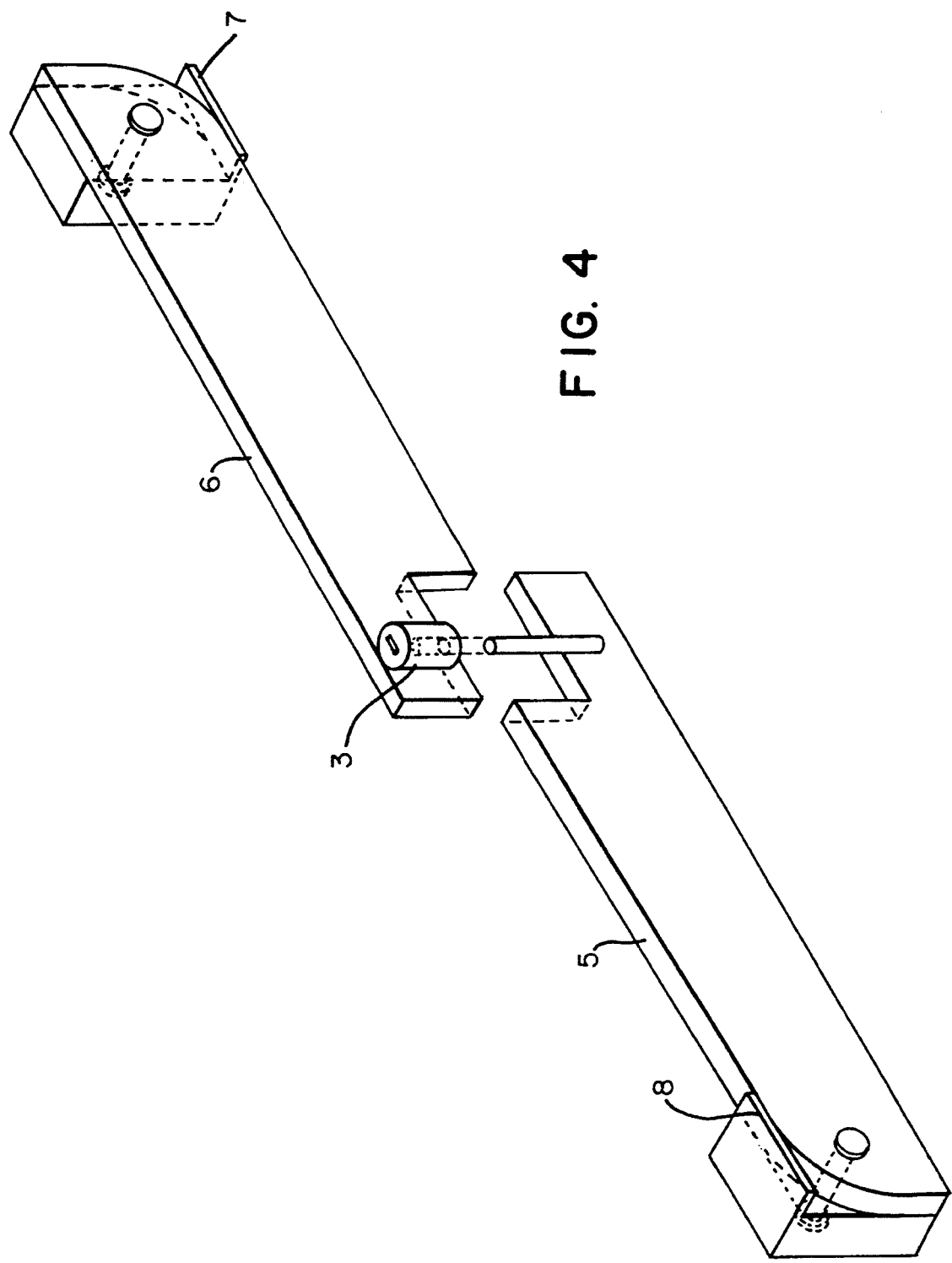
FIG. 4 is an isolated view of the movable arms and locking device of the invention.

1 of FIG. 1—$\frac{1}{4}''$ bolt holes for tags (typ. of 4), #3 of FIG. 1—locking device, —#1 of FIG. 2—$\frac{1}{4}''$ bolt holes for tags (typ. of 4), #2 of FIG. 2—$\frac{1}{4}''$ ribbets for movable arm (typ. of 2), #3 of FIG. 2—locking device, #4 of FIG. 2—1/16'' thick steel plate, #5 of FIG. 2—movable arm (down swing), #6 of FIG. 2—movable arm (up swing); optional view—#2A of op. view—ribbets, 3A of op. view-locking device, 5A of op. view-moving arm (down swing), 6A of op. view-moving arm (up swing), #1 of FIG. 3—$\frac{1}{4}''$ holes (typ. of 4) #4 of FIG. 3—1/16'' thick steel plate, #2 of FIG. 4—$\frac{1}{4}''$ $\phi$ ribbet, #5 of FIG. 4—swing down movable arm, #6 of FIG. 4—swing up movable arm, #7 of FIG. 4—stop plate, #8 of FIG. 4—stop plate, #9 of FIG. 4—locking device (key or combination lock).

The device (FIG. 2) comprises a frame member #4 formed from a sheet material (1/16'' thick plate) into a channel member to receive a license plate. The upper portion of the frame 4 has movable arms 5, 6 pivoted to the frame top portion arms and locked into place by a conventional key or combination lock mechanism. The back plate of the frame member 4 (as shown in FIG. 3) is bolted to the car body through bolt holes 1 ($\frac{1}{4}''$). The movable arms 5, 6 are pivoted to the upper frame ends by rivets 2 ($\frac{1}{4}''$) in order to swing away from the horizontal position to allow for insertion of the license plate 10. The arms 5 has an extension at the end opposite the pivot end to abut against an extension on the arm 6. The arm 5 swings downwardly and the arm 6 swings upwardly to receive the license plate 10. The upper frame ends have stop plates 7, 8 on the arms 11, 12, to restrict motion of the movable arms 5, 6. The left upper frame arm 12 has a stop plate 8 on the upper surface to restrict upward swinging of the movable arm 5 and the right upper frame arm 11 has a stop plate 7 on the lower surface to restrict downward swinging of movable 6.

Upon swinging of the arms 5, 6 to a horizontal position, closing up the frame member 4, with the license plate inside, the locking device 3 is activated to lock the arms 5, 6 together and prevent access to the plate 10.

FIG. 2A shows an optional configuration for the movable arms 5A, 6A using a conventional locking device 3A.

This configuration may be used if the frame opening needs to be on the end instead of the top to allow insertion of the license plate.

I claim:

1. A lockable license plate holder, for preventing unauthorized access to a license plate on a vehicle, comprising: a frame member adapted to be mounted to the vehicle body with bolt means and having a top member, a bottom member, and side members with a channel formed in the bottom and side members to receive a license plate therein, the top member of the frame comprises first and second movable arms, the first movable arm is pivotably mounted at one end to one side member with means for upward movement and, the second movable arm is pivotably mounted at one end to the other side member with means for downward movement, whereby the two arms are pivotable away from each other into an open position to allow insertion of the license plate into the frame member and, pivotable toward each into an abutting closed position to enclose the license plate within the frame, and a locking device mounted on the opposite ends of the movable arms to lock the movable arms in the closed position.

* * * * *